United States Patent [19]

Brachthauser et al.

[11] 4,226,586

[45] Oct. 7, 1980

[54] METHOD AND APPARATUS FOR THE THERMAL TREATMENT OF FINE-GRAINED MATERIAL WITH HOT GASES

[75] Inventors: Kunibert Brachthauser, Bergisch-Gladbach; Horst Herchenbach, Troisdorf, both of Fed. Rep. of Germany

[73] Assignee: Klöckner-Humboldt-Wedag AG, Fed. Rep. of Germany

[21] Appl. No.: 932,902

[22] Filed: Aug. 11, 1978

[30] Foreign Application Priority Data

Aug. 13, 1977 [DE] Fed. Rep. of Germany ....... 2736607

[51] Int. Cl.$^2$ .............................................. F27B 7/02
[52] U.S. Cl. ..................................... 432/106; 432/58
[58] Field of Search ....................... 432/14, 15, 58, 106

[56] References Cited

U.S. PATENT DOCUMENTS

| | | | |
|---|---|---|---|
| 4,002,420 | 1/1977 | Christiansen | 432/58 |
| 4,004,876 | 1/1977 | Sylrest | 432/106 |
| 4,035,139 | 7/1977 | Goldmann et al. | 432/58 |
| 4,088,438 | 5/1978 | Deussner et al. | 432/58 |
| 4,118,176 | 10/1978 | Mollenkopf | 432/106 |

FOREIGN PATENT DOCUMENTS

| | | |
|---|---|---|
| 2324519 | 5/1973 | Fed. Rep. of Germany . |
| 2324565 | 5/1973 | Fed. Rep. of Germany . |
| 2545933 | 10/1975 | Fed. Rep. of Germany . |

*Primary Examiner*—John J. Camby
*Attorney, Agent, or Firm*—Hill, Van Santen, Steadman, Chiara & Simpson

[57] ABSTRACT

An apparatus for the thermal treatment of fine-grained material such as for the calcination of cement including a suspension type gas heat exchanger having a plurality of stages of progressively higher temperatures in the direction of material flow. A conduit connects the hottest stage of the heat exchanger with a rotary kiln. A combustion zone is provided within the conduit and rapidly oxidizing fuel components are introduced into this combustion zone. Slowly oxidizing fuel components are introduced into the rotary kiln in a second combustion zone.

6 Claims, 2 Drawing Figures

METHOD AND APPARATUS FOR THE THERMAL TREATMENT OF FINE-GRAINED MATERIAL WITH HOT GASES

The invention relates to a method for the thermal treatment of fine-grained material with hot gases, particularly for the calcination of cement in several steps, whereby the material is preheated in a heat-exchanger, during supply of fuel subjected to a separate calcination process for the deacidification of the calcium carbonate portions, and calcined to completion in a calcination furnace by means of a sintering process.

The invention relates also to an apparatus for carrying out the calcination process.

It is for example known in the production of cement, through an additional calcination device in the gas conduit between a sintering furnace and the pertaining heat-exchanger-system, to carry out the deacidification of the pulverized raw material to be used in the manufacture of cement, in the heat-exchanger system almost completely so that in the rotary kiln practically still only the clinker formation, that is the calcination to completion of the material needs to be carried out.

In modern cement installations of large to very large output yields of 3,000 tons per diem of clinker and beyond this, the gas conduit between rotary kiln and heat exchanger system has such dimensions that in spite of expensive technical measures it comes to appreciable difficulties to carry out optimally the additional calcination zone in the area of the heat exchanger system in order also to attain with all load conditions, the desired calcination of the charging material without over-calcination phenomena. Hereby it is essential that the deacidification of a lime particle in suspension depends essentially on the temperature, the duration and the range of grain sizes.

It was found that with all measures, to burn the entire fuel in a single additional combustion zone in finely divided form in suspension, high exhaust-gas-losses would have to be taken into consideration, which were caused thereby that the reaction time for the oxidation and/or the gasification or carburetion of the fuel is so short and in addition the heat cannot be transferred in the short time of a few seconds to the relatively coarse particles of pulverized raw material, without the fact that high reaction temperatures would have to be adjusted.

From the German Laid Open Specification No. 23 24 565, it is known to introduce all of the fuel of the additional combustion zone in fine division into the furnace-exhaust-gas conduit of a suspension-gas-heat-exchanger-system, and at the same time to release the stream of material into the gas stream with the aid of a distributor member. In this connection, the mentioned disadvantages occur.

In order to influence the deacidification temperature, according to another method (German Laid Open Specification No. 23 24 519), in which pulverized raw material to be used for cement is to be calcined in the furnace exhaust gas conduit leading from the rotary kiln in the hottest zone of the preheater, by means of additionally supplied fuel, this fuel is added to the pulverized material before entry into the exhaust-gas-conduit in finely divided form. Hereby however, the danger exists that particularly with large cement-manufacturing-installations with high output yields, on account of the appreciable dimensions of the furnace-exhaust-conduit, a more uniform heat transfer from fuel to the particles of pulverized raw material cannot be attained on account of the different concentration of pulverized raw material in the furnace-exhaust-gas. Upon lack of oxygen, the carbon reacts chemically with the constituents of pulverized raw material. In addition, it comes to local heat-transfer bids so that the maximum temperatures provided upon the calcination are uncontrollably exceeded. The fusible pulverulent material is converted through the chemical reaction of Fe with C and beginning molten-phase-formation, into an undesired condition, in which through agglomeration,—the heat transfer in the hottest step of the preheater and in the rotary kiln, may be sensitively disturbed.

From the German Laid Open Specification No. 25 45 933, a method for the thermal treatment of pulverized raw material to be used in the manufacture of cement, is known, in which high-grade fuel in finely divided form is sprayed on the surface of the material entered into a rotary kiln directly from a suspension-gas-preheater. Directly thereafter, the finely divided fuel is to be filled from the material charged or newly rolled around, respectively, in the kiln. Hereby is to be attained a homogeneous mixture of material and fuel, before the fuel is to be burnt out in the oxygen-rich atmosphere of the rotary kiln. That has, however, the known disadvantage as result, that the particles of fuel present in finely divided form have a prerequisite shock-type combustion conditions with their large surface, and an uncontrollable local combustion results which leads to overheating phenomena of the material already precalcined to a fargoing extent. In other areas, to the contrary, the carbon reacts during absence of oxygen chemically with the constituents of pulverized raw material, so that agglomerations of the pulverized raw material occur and render its calcination impossible to a fargoing extent. In addition, the danger exists of stronger accretions of the furnace, which negatively influence the conduct of the furnace.

It is the object of the invention, upon prevention of the disadvantages of the state of the art, to furnish a method with which finely-grained substances may be uniformly and completely calcined in a calcination zone with separate fuel supply, and that for the purpose, fuels with the most different heat contents and forms of condition may be utilized, whose heat contents are controlled and transferred without heat losses to the fine-grained material. It is also the object of the invention to furnish a calcination device, in which exclusively the installation parts according to type of structure and size previously used and necessary may be used, so that additional investment costs are avoided to a fargoing extent.

This object is solved according to the invention, thereby that the fuel supplied is so composed that rapidly oxidizing fuel-components and/or -portions burning out in suspension give off their heat contents completely in a first process step of the separate combustion process, to the fine components of the pulverized raw material for cement and in a second process step, slowly oxidizing fuel-components and/or portions with the at least partially deacidified pulverized raw material to be used for cement are charged into the calcination furnace and there burning out before the beginning of the sintering, bring about a further deacidification, particularly of the coarse components of the pulverized raw material.

By means of this measure, it is advantageously attained that rapidly- and easily-oxidizing fuel constituents may burn out uniformly in the hottest step of a suspension-gas-heat-exchanger, and thereby its heat given off completely to the aerosol-type finely divided pulverized raw material for cement. An oxidation during lack of air and therewith chemical reactions and agglomerations in the pulverized raw material are completely prevented thereby. Likewise, additional losses of exhaust gas are completely prevented, as the entire quantity of heat of the easily burnt out fuel components is absorbed in shortest time by the pulverized raw material present in the suspension. The fuel components, difficult to volatilze, which are frequently present as solid fuels, are then burned in the second process step with the at least partially deacidified pulverized raw material for cement, in the calcining furnace or kiln. By means of the volatilization, difficult to accomplish, of these fuel components, their gasification and oxidation proceed so slowly, that the heat being released may be absorbed easily by the surface of the comminuted raw material and by the gas stream, so that even in the second combustion zone of the calcination step, a local supply of heat and therewith agglomerations and formation of accretions are prevented.

In development of the invention, it is provided that the entire fuel is introduced in the first process step, and its slowly oxidizing fuel-components and/or -portions separated from the hot gases by means of an intentional or prospective operation, and with the at least partially deacidified pulverized raw material for cement are introduced into the second process step. By means of this measure, after an optimal heat transfer from the rapidly oxidizing fuel components or fuel portions to the fine particles of pulverized raw material for cement in the hottest step of the suspension-gas-heat-exchanger, during the subsequent intentional progress of the at least partially calcined pulverized raw material from the hot gases, an intensive mixture of the pulverized raw material and a rendering uniform of the temperature of the pulverized raw material may take place, so that this material and the slowly oxidizing fuel components upon uniform temperature level may be mixed with one another, and an optimal burning of these fuel components in the calcination furnace or kiln and an optimal heat transfer to the calcination material may take place for the further calcination. Also, thereby, the time required for the calcination of the coarse material is extended so advantageously that an optimal deacidification of the portions of calcium carbonate takes place.

In further embodiment of the invention, it is provided that the fuel is supplied separately to the separate calcination process, whereby rapidly oxidizing fuel components of the first process are supplied to the suspension-gas-heat-exchanger and slowly oxidizing fuel components of the second process step are supplied to the calcination furnace or kiln. In this way, it is possible to convey to the separate calcination process fuels with different heat contents, different quality and forms of condition, so that for example, to the first process step is supplied high-grade fuel heat exactly in the quantity as may be absorbed by the pulverized raw material for cement in the first process step during the short reaction time available. It is particularly economical in this connection, that the fuel in each case is introduced at that place in the system which corresponds to its thermal and chemical valence. The second process step then receives the solid fuel components which are volatile with greater difficulty in the hot gases, so that during a longer time, free quantities of heat may be transferred uniformly to the pulverized raw material. It is suitable in this connection that upon the utilization of solid fuel, the latter is so ground up or broken up, that the coarse portion of the fuel brings about out of its granulation spectrum a deacidification of the pulverized raw material in the calcination furnace or kiln between 5 to 50%, advantageously between 15 and 25%. Thereby, the coarse portion of the solid fuel floats with an advantageous grain size between 0.2 to 25 mm., as it were, on the bed of pulverized raw material in the rotary kiln, so that the gasification and oxidation of this portion of fuel proceeds slowly, however, not during lack of oxygen, and the heat becoming released may be absorbed easily by the surface of pulverized raw material and the hot gases. Upon lack of oxygen, chemically induced agglomerations are thus completely prevented.

The invention relates also to an apparatus for the thermal treatment of fine-grained material with not gases, particularly for the calcination of cominuted raw material for cement, in several steps, in which according to the invention, the hottest step of a suspension-gas-heat-exchanger connected in series on the material side of a calcination furnace or kiln, advantageously a rotary kiln is constructed as a first calcination line for rapidly oxidizing fuel, and in the rotary kiln in front of its sintering zone is arranged a second calcination line for slowly oxidizing fuel. The advantage of this apparatus embodiment lies therein, that with the aggregates predetermined by the installation-technique, a two-step version of the calcination line for the calcination of the material is attained, whereby the first calcination line is integrated in the heat exchanger, and the second calcination line is found in the rotary kiln in front of its sintering zone. The reaction line in the suspension-gas-heat-exchanger may be held short, whereby long and expensive burn-out-conduits are prevented Hereby also, in the case of cement installations with high output yields, with the lowest apparatus expenditure, a sufficient duration for the material to be treated in hot gas atmosphere may be attained, in which without exceeding the material limit temperatures, it is completely and uniformly calcined.

In embodiment of the invention, it is provided that the first calcination line has in each case at least one separate fuel feed device, which is arranged in the furnace-exhaust-gas-conduit, so that in this gas conduit, already a sufficient duration is available in order to transfer the easily volatile fuel components on the finely dispersed material to its at least partial calcination. With advantage, the second calcination line has in each case at least one separate fuel-supply-device, which is arranged in the furnace-inlet-head and/or in the material conduit between the hottest heat-exchanger-step and the rotary kiln, so that also hereby exclusively installation parts may be utilized, which in any case must be present in the cement manufacturing installation.

The invention will be described in greater detail in the following on the basis of embodiments by way of example in diagrammatic showing.

Figure 1:
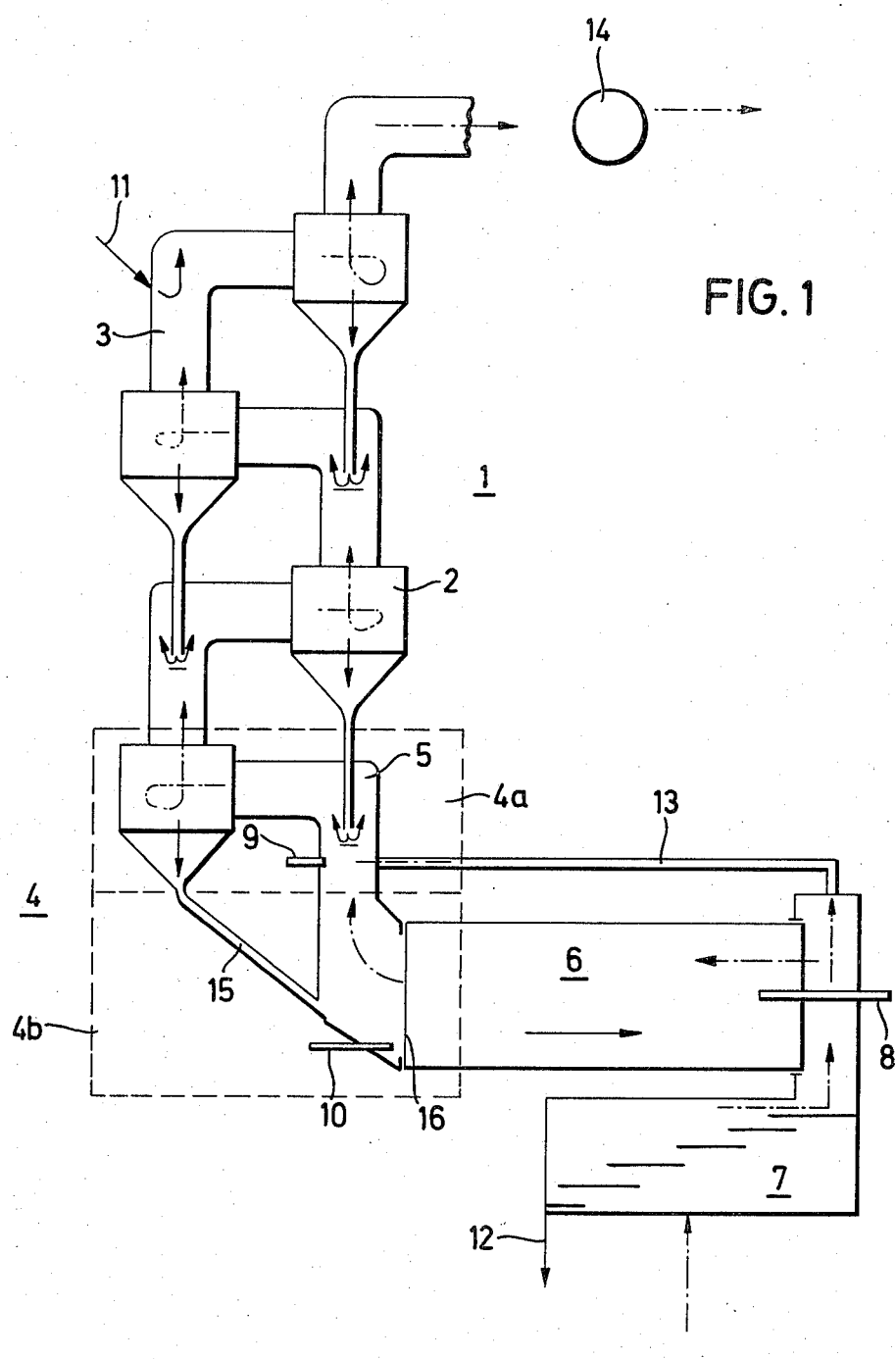
FIG. 1 shows a cement installation with cyclone-heat-exchanger, rotary kiln and grid-cooler.

According to FIG. 1, the installation for the thermal treatment of fine-grained material with hot gases in several steps, particularly of pulverized raw material to be used in the manufacture of cement,—consists of a heat-exchanger 1 operating according to the suspension-gas-principle, which in known manner consists of several cyclones 2 arranged superimposed, which in each case are in connection with one another by means of a gas conduit 3. With the heat exchanger is connected in series on the material side, a calcination line 4 which consists of a first calcination line 4a for easily volatile fuel and a calcination line 4b for fuel components which volatilize with difficulty. The calcination line 4a is in this connection integrated in the heat exchanger 1 and arranged in the furnace-exhaust-gas-conduit 5, while the calcination line 4b is located in a rotary kiln 6 connected in series on the material side with the heat exchanger 1. With the furnace 6 is connected in series on the material side a grid-cooler 7.

The rotary kiln 6 has in the material outflow area a fuel supply 8. Both the calcination line 4a for the easily volatile fuel components arranged in the exhaust gas conduit 5 as well as also the calcination line 4b for the fuel components volatile with difficulty, arranged in the rotary kiln 6 in front of its sintering zone, have separate fuel feed devices 9, 10.

The pulverized raw material for cement to be treated is delivered into the heat exchanger 1 at 11, and leaves the manufacturing installation at 12 as clinker burnt to completion and cooled to further treatment temperature, out of the cooler 7. The cool air introduced into the material cooler 7 is heated and is supplied partly through a conduit 13 as combustion air to the first calcination line 4a, and the other part as combustion air is delivered into the rotary kiln for the fuel 8 and 10. The hot gases resulting in the rotary kiln pass through its sintering zone, and the second calcination 4b pass through the first calcination line 4a into the heat exchanger 1, pass from the same into the cyclone steps lying thereabove, of the heat exchanger 1, there heat the material and are drawn off as still hot exhaust gases from the installation through the blower 14, for example, for the raw material drying.

In operation, the entire quantity of the pulverized raw material for cement is supplied to the cement manufacturing installation at 11 in the uppermost step of the cyclone heat exchanger 1, and passes through the heat exchanger from the top downwardly in countercurrent to the hot gases. The pulverized raw material thus preheated passes then into the hottest step of the suspension-gas-preheater in the exhaust gas conduit 5 leading from the rotary kiln to the lowermost cyclone 2 of the heat exchanger 1. There, through the separate fuel feed device 10, as much easily volatile fuel, for example, gas oil or fuel oil is supplied and burnt, as may be absorbed by the pulverized raw material during its short flight-time to the lowermost cyclone 2 of the heat exchanger 1. In the lowermost cyclone of the heat exchanger a separation takes place of the partially calcined material from the heating gases, and the pulverized raw material for cement is guided through the material conduit 15 into the furnace-inlet head 16 of the rotary kiln 6. There, through the further separated fuel feed device 10, fuel portions volatile with difficulty, for example coarsely ground coal, is introduced, which before the beginning of the sintering zone of the rotary kiln burn out in the inlet area of the same and there bring about the further deacidification of the pulverized raw material. The pulverized raw material thus deacidified, is then guided into the sintering zone of the rotary kiln and there, with the aid of the fuel 8 is burnt to completion to clinker and after cooling in the cooler 7 is drawn off from the installation.

Figure 2:
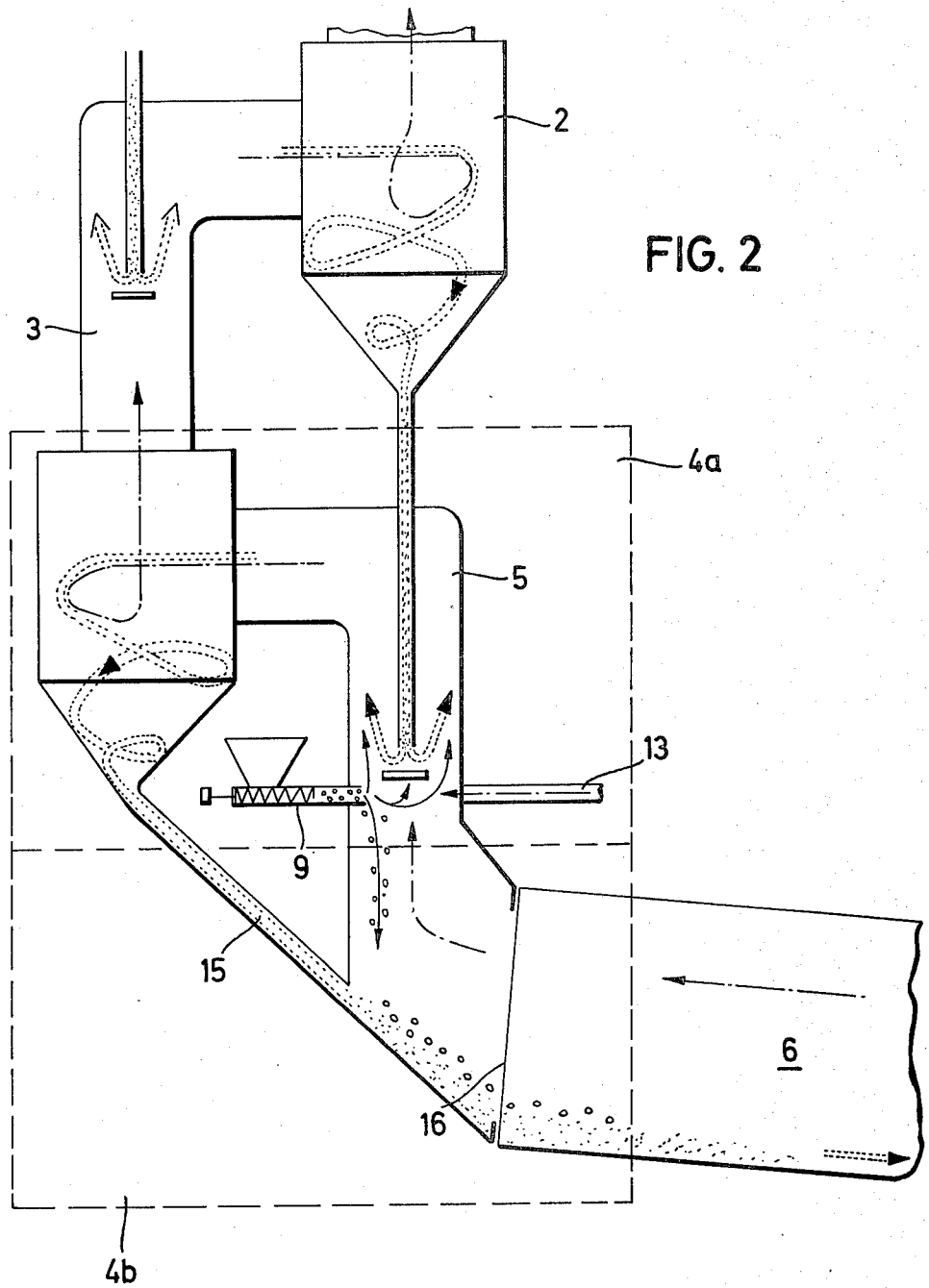
FIG. 2 shows a cutaway portion of the cement installation on enlarged scale.

Upon the utilization of an exclusively solid fuel, according to FIG. 2, the entire quantity of the fuel is introduced through the fuel feed device 9 into the exhaust-gas-conduit 5 between rotary kiln 6 and lowermost cyclone step 2 of the heat exchanger 1. Hereby, the fuel is so ground up or broken up that the fine- and easily-volatile fuel portion out of its grain-spectrum brings about a pre-deacidification of the pulverized raw material for cement in this first process step to about 60%. The coarse portion of the fuel is sifted out in the exhaust-gas-conduit out of the gas current according to the gravity principle and deposits itself on the stream of material conveyed out of the lowermost cyclone step 2 of the heat exchanger through the material conduit 15 into the rotary kiln 6. After common introduction into the furnace inlet head 16 of the rotary kiln 1, the coarse fuel slowly burns out on the surface of the bed of pulverized raw material and brings about still in front of the sintering zone of the furnace the remaining deacidification of the pulverized raw material. The latter is then burnt to completion in the sintering zone of the rotary kiln and in known manner drawn off as clinker out of the cooler 7. For this purpose, the granulation spectrum of the solid fuel is so adjusted that its coarse portion has a grain size between 0.2 to 25 mm.

The invention is not limited to the embodiment shown by way of example, but advantageously, in addition to a suspension-heat-exchanger according to the cyclone type of construction, also all other suspension-gas-heat-exchangers may be utilized. Likewise, all types of fuel, solid, liquid or gaseous, and different qualities of fuel such as oil shale, synthetic material granulates or oil-coke may be utilized. Also, all of the fuel required for the deacidification of the pulverized raw material may be supplied through a common fuel conduit, which is arranged in the area of the furnace-inlet-head. Particularly upon the utilization of coal ground up in the industrial granulation area, it is attained that the fine portion of the coal is carried by the gas stream out of the furnace into the exhaust-gas-conduit and there forms a preoxidation zone. Subsequently the portion of fine fuel not yet burnt in the hot gases is mixed with the pulverized material for cement dispersed in the exhaust-gas-conduit 5, so that there a uniform and at least partial calcination of the pulverized raw material is carried out. The further calcination in the furnace is then carries out with the aid of the sifted out coarse portions of fuel. With rotary kilns highly loaded as to output with very high gas speeds in the inlet zone, in this manner, also the forcibly torn along material and transported back into the preheater may be subjected to a further heat treatment. Thereby result further new possibilities upon installation of highly loaded and therewith relatively small and short furnaces.

The separate supply of preheated combustion air to the reaction steps insures in addition with the aid of the adjustment of the air relation, an additional influencing of the reaction of the particular fuel components and an optimal control of the endothermic deacidification process in the pulverized raw material for use in the manufacture of cement.

We claim:

1. An apparatus for the thermal treatment of fine-grained material with hot gases comprising a suspension gas heat exchanger having a plurality of stages of progressively higher temperatures in the direction of material flow, a rotary kiln, conduit means connecting the hottest stage of said heat exchanger with said rotary kiln, means within said conduit means defining a first combustion zone, means for introducing rapidly oxidizing fuel components into said first combustion zone, means in said rotary kiln defining a second combustion zone, and means for introducing slowly oxidizing fuel components into said second combustion zone.

2. An apparatus according to claim 1 in which: said second combustion zone is located in the material inlet of said rotary kiln.

3. An apparatus according to claim 2 in which: said first combustion zone includes at least one separate fuel feed device located in said conduit means.

4. An apparatus according to claim 2 in which: said second combustion zone includes at least one separate fuel feed device at the inlet end of said rotary kiln.

5. An apparatus according to claim 2 which includes a common fuel inlet for said first and second combustion zones.

6. An apparatus according to claim 2 which includes means connecting said conduit means with a supply of hot exhaust gases from a cooler.

* * * * *